United States Patent
Brooks et al.

(10) Patent No.: US 12,275,673 B2
(45) Date of Patent: Apr. 15, 2025

(54) METHOD FOR THE MANUFACTURE OF HYDRAULIC BINDERS FROM WATER TREATMENT RESIDUALS

(71) Applicant: ARDEX Group GmbH, Witten (DE)

(72) Inventors: Stephen Alan Brooks, Suffolk (GB); Mark Russell, Belfast (GB)

(73) Assignee: ARDEX Group GmbH, Witten (DE)

( * ) Notice: Subject to any disclaimer, the term of this patent is extended or adjusted under 35 U.S.C. 154(b) by 654 days.

(21) Appl. No.: 17/613,854

(22) PCT Filed: Jun. 12, 2020

(86) PCT No.: PCT/EP2020/066317
§ 371 (c)(1),
(2) Date: Nov. 23, 2021

(87) PCT Pub. No.: WO2020/249739
PCT Pub. Date: Dec. 17, 2020

(65) Prior Publication Data
US 2022/0227666 A1    Jul. 21, 2022

(30) Foreign Application Priority Data

Jun. 12, 2019 (GB) ..................................... 1908383
Mar. 13, 2020 (GB) ..................................... 2003674

(51) Int. Cl.
| | |
|---|---|
| C04B 7/32 | (2006.01) |
| C01F 7/46 | (2006.01) |
| C02F 1/00 | (2023.01) |
| C02F 11/06 | (2006.01) |
| C02F 11/08 | (2006.01) |
| C02F 11/123 | (2019.01) |
| C02F 11/13 | (2019.01) |

(Continued)

(52) U.S. Cl.
CPC ............ *C04B 7/323* (2013.01); *C01F 7/46* (2013.01); *C02F 1/008* (2013.01); *C02F 11/06* (2013.01); *C02F 11/08* (2013.01); *C02F 11/123* (2013.01); *C02F 11/13* (2019.01); *C02F 11/145* (2019.01); *C04B 7/02* (2013.01); *C04B 7/24* (2013.01); *C04B 7/32* (2013.01); *C04B 7/40* (2013.01); *C04B 7/434* (2013.01); *C04B 7/4423* (2013.01); *C04B 7/51* (2013.01); *C04B 7/52* (2013.01); *C04B 7/525* (2013.01); *C04B 14/06* (2013.01); *C04B 14/28* (2013.01); *C04B 22/064* (2013.01); *C04B 22/143* (2013.01); *C04B 24/2611* (2013.01); *C04B 24/2641* (2013.01); *C04B 28/04* (2013.01); *C04B 28/06* (2013.01); *C04B 28/065* (2013.01); *C04B 28/14* (2013.01); *C04B 28/146* (2013.01); *C04B 28/147* (2013.01); *C04B 28/16* (2013.01); *F23G 5/0273* (2013.01); *F27B 7/08* (2013.01); *F27B 7/36* (2013.01); *C01P 2002/72* (2013.01); *C02F 2101/10* (2013.01); *C02F 2209/02* (2013.01); *C04B 2103/0068* (2013.01); *C04B 2111/00637* (2013.01); *C04B 2111/00646* (2013.01); *C04B 2111/60* (2013.01); *F23G 2201/20* (2013.01); *F27B 2007/005* (2013.01); *Y02P 40/10* (2015.11); *Y02P 40/121* (2015.11); *Y02P 40/125* (2015.11); *Y02W 10/37* (2015.05); *Y02W 10/40* (2015.05); *Y02W 30/91* (2015.05)

(58) Field of Classification Search
CPC .. C04B 7/323; C04B 7/02; C04B 7/24; C04B 7/32; C04B 7/40; C04B 7/434; C04B 7/4423; C04B 7/51; C04B 7/52; C04B 7/525; C04B 14/06; C04B 14/28; C04B 24/2611; C04B 24/2641; C04B 28/06; C04B 28/065; C04B 28/14; C04B 28/146; C04B 28/147; C04B 2111/00637; C04B 2111/00646; C04B 2111/60; C04B 28/16; C04B 28/04; C04B 2103/0068; C04B 22/064; C04B 22/143; C01F 7/46; C02F 1/008; C02F 11/08; C02F 11/123; C02F 11/13; C02F 2101/10; C02F 2209/02; C02F 11/06; C02F 11/145; F23G 5/0273; F23G 2201/20; F27B 7/08; F27B 7/36; F27B 2007/005; C01P 2002/72; Y02P 40/121; Y02P 40/125; Y02P 40/10; Y02W 10/37; Y02W 10/40; Y02W 30/91
See application file for complete search history.

(56) References Cited

U.S. PATENT DOCUMENTS

| | | |
|---|---|---|
| 4,352,660 A | 10/1982 | Steiner et al. |
| 4,671,497 A | 6/1987 | Schmitz et al. |

(Continued)

FOREIGN PATENT DOCUMENTS

| | | |
|---|---|---|
| CN | 1557714 A | 12/2004 |
| CN | 1705622 A | 12/2005 |

(Continued)

OTHER PUBLICATIONS

Office Action for China Application No. 202080039362.5 mailed on Apr. 29, 2023, English translation enclosed, 18 pages.

(Continued)

*Primary Examiner* — Anthony J Green
(74) *Attorney, Agent, or Firm* — Todd Esker; Bret E. Field; Bozicevic, Field & Francis LLP

(57) ABSTRACT

A method for the manufacture of a high alumina hydraulic binder comprising hydrating a source of aluminium ions with a source of calcium ions in the presence of water to form mineral hydrates and subsequently heating said mineral hydrates to form said high alumina hydraulic binder.

5 Claims, 1 Drawing Sheet

Figure 1:
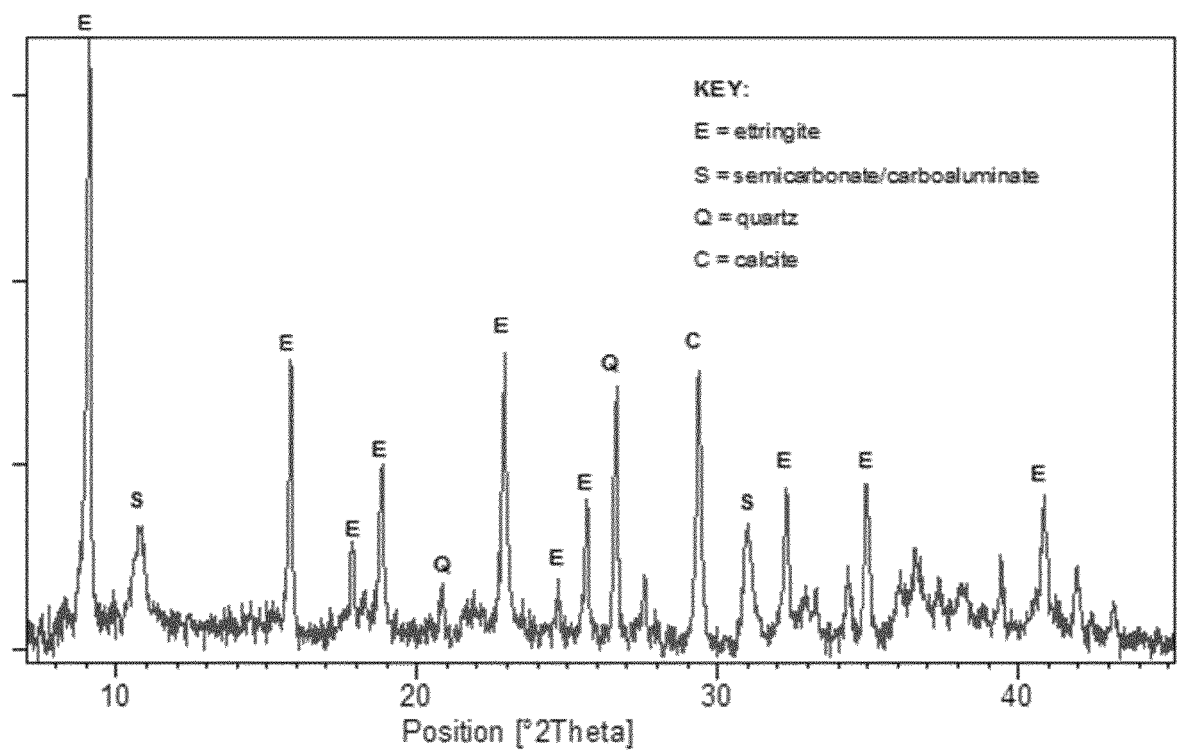

(51) Int. Cl.

| | | |
|---|---|---|
| *C02F 11/145* | (2019.01) | |
| *C04B 7/02* | (2006.01) | |
| *C04B 7/24* | (2006.01) | |
| *C04B 7/40* | (2006.01) | |
| *C04B 7/43* | (2006.01) | |
| *C04B 7/44* | (2006.01) | |
| *C04B 7/51* | (2006.01) | |
| *C04B 7/52* | (2006.01) | |
| *C04B 14/06* | (2006.01) | |
| *C04B 14/28* | (2006.01) | |
| *C04B 22/06* | (2006.01) | |
| *C04B 22/14* | (2006.01) | |
| *C04B 24/26* | (2006.01) | |
| *C04B 28/04* | (2006.01) | |
| *C04B 28/06* | (2006.01) | |
| *C04B 28/14* | (2006.01) | |
| *C04B 28/16* | (2006.01) | |
| *F23G 5/027* | (2006.01) | |
| *F27B 7/08* | (2006.01) | |
| *F27B 7/36* | (2006.01) | |
| *C02F 101/10* | (2006.01) | |
| *C04B 103/00* | (2006.01) | |
| *C04B 111/00* | (2006.01) | |
| *C04B 111/60* | (2006.01) | |
| *F27B 7/00* | (2006.01) | |

(56) References Cited

U.S. PATENT DOCUMENTS

| | | | |
|---|---|---|---|
| 5,108,510 | A | 4/1992 | Burge et al. |
| 2006/0048684 | A1 | 3/2006 | Bonetto et al. |
| 2007/0193477 | A1 | 8/2007 | Sawaki et al. |
| 2018/0127315 | A1 | 5/2018 | Brigandat et al. |

FOREIGN PATENT DOCUMENTS

| | | | | | |
|---|---|---|---|---|---|
| CN | 1926074 | A | | 3/2007 | |
| CN | 1966449 | A | | 5/2007 | |
| CN | 105392754 | A | | 3/2016 | |
| EP | 2695850 | A1 | | 2/2014 | |
| EP | 3505239 | A1 | | 7/2017 | |
| EP | 3983359 | A1 | | 4/2022 | |
| GB | 2401104 | A | | 11/2004 | |
| GB | 2401104 | B | | 8/2007 | |
| GB | 2586951 | A | | 3/2021 | |
| JP | S62-91300 | A | | 4/1987 | |
| JP | 63-95114 | A | * | 4/1988 | C04B 7/24 |
| JP | S63-95114 | A | | 4/1988 | |
| JP | 5-310453 | A | * | 11/1993 | C04B 7/24 |
| JP | H5-310453 | A | | 11/1993 | |
| JP | H6-15297 | A | | 1/1994 | |
| JP | H11-314098 | A | | 11/1999 | |
| JP | 2005-75712 | A | | 3/2005 | |
| JP | 2006-193387 | A | | 7/2006 | |
| KR | 2011-0091171 | A | | 8/2011 | |
| KR | 101089520 | B1 | * | 11/2011 | C04B 7/32 |
| KR | 10-1336300 | A | | 12/2013 | |
| PT | 104535 | B | | 7/2011 | |
| RU | 2219129 | C2 | | 12/2003 | |
| RU | 2255916 | C1 | | 7/2005 | |
| RU | 2368578 | C1 | | 9/2009 | |
| RU | 2442759 | C2 | | 2/2012 | |
| RU | 2607632 | C2 | | 1/2017 | |
| SU | 1604772 | A1 | | 11/1990 | |
| WO | WO8804285 | A1 | | 6/1988 | |
| WO | WO9626900 | A1 | | 9/1996 | |
| WO | WO2019092360 | A1 | | 5/2019 | |
| WO | WO2020249739 | A1 | | 12/2020 | |

OTHER PUBLICATIONS

Office Action for Indonesia Application No. P00202110468 mailed on Jul. 11, 2023, with English translation, 5 pages.
Office Action for India Application No. 202147055857 mailed on Jul. 21, 2023, 6 pages.
Office Action for Russia Application No. 2021134694/03 mailed on Jun. 21, 2023, with English translation, 10 pages.
Search Report for Russia Application No. 2021134694/03 mailed on Jun. 20, 2023, with English translation, 4 pages.
Office Action for GB Application No. GB1908383.1 mailed Jun. 8, 2022, 5 pages.
Second Office Action for Chinese Application No. 202080038955.X mailed on Feb. 19, 2023, with its English translation, 26 pages.
Office Action for European Application No. 20732860.0 mailed on Feb. 20, 2023, with its English translation, 10 pages.
Zou, Technology and Principles of Materialized Utilization of Sludge, Heilongjiang University Press, May 2015, pp. 135-138.
Xu, Corundum Refractories, 2nd edition, Metallurgical Industry Press, Jun. 2007, pp. 283-285.
Second Office Action for China Application No. 202080039721.7 mailed on May 11, 2023, English translation, 25 pages.
Office Action for United Kingdom Application No. GB1908383.1 mailed on May 25, 2023, 3 pages.
Examination Report for GB Application No. 1908383.1 mailed Feb. 10, 2023.
Office Action for Russian Application No. 2021134521/03 mailed on Jul. 11, 2023, with English translation, 16 pages.
Search Report for Russian Application No. 2021134521/03 mailed on Jul. 10, 2023, with English translation, 4 pages.
First Office Action for Chinese Application No. 202080039721.7 mailed Aug. 2, 2022, with its English summary, 12 pages.
First Office Action for Chinese Application No. 202080039362.5 mailed Aug. 15, 2022, with its English translation, 25 pages.
Guo et al., Mineral Formation Mechanism of Calcium Sulphoaluminate Cement Clinker in Hydrothermal-Low Temperature Sintering Process, Journal of the Chinese Ceramic Society, Feb. 2018, vol. 46, No. 2; Abstract Only, 6 pages.
Office Action for European Application No. 20732866.7 mailed on Feb. 20, 2023, 4 pages.
Office Action for European Application No. 20732865.9 mailed on Feb. 22, 2023, 5 pages.
First Office Action for Chinese Application No. 202080038955.X mailed Aug. 9, 2022, with its English summary, 16 pages.
Dahhou et al., Alumina sludge's Influence on the physicochemical characteristics of CPJ55 cement, MATEC Web of Conferences 149, 01058, Jan. 2018.
Chen et al., Reuse of water purification sludge as raw material in cement production, Cement & Concrete Composites 32 (2010) 436-439.
Examination Report for GB Application No. 2003674.5 mailed Oct. 28, 2022, 3 pages.
Office Action for European Application No. 20839233.2 mailed on Oct. 5, 2023, with its English Translation, 8 pages.
Office Action for Russian Application No. 2021134155/03 mailed on Aug. 30, 2023, with its English Translation, 12 pages.
Search Report for Russian Application No. 2021134155/03 mailed on Aug. 30, 2023, with its English Translation, 4 pages.
Dahhou et al., Alumina sludge's Influence on the physicochemical characteristics of CPJ55 cement, MATEC Web of Conferences 149, 01058 (2018), 5 pages.
Rejection of the Decision for Chinese Application No. 202080038955.X mailed on Aug. 15, 2023 with its English Translation, 18 pages.
Office Action for Russia Application No. 2021134155/03 mailed Jan. 30, 2024, with its English translation, 10 pages.
Office Action for Indonesian Application No. P00202110555 mailed on Aug. 2, 2023, with its English translation, 6 pages.
Office Action for Indonesian Application No. P00202110524 mailed on Aug. 4, 2023, with its English translation, 6 pages.
Office Action for India Application No. 202147057863 mailed on Dec. 19, 2023, 6 pages.
Ahmad et al., Investigating calcined filter backwash solids as supplementary cementitious material for recycling in construction practices, Construction and Building Materials, vol. 175, Jun. 30, 2018, p. 664-671.

(56) References Cited

OTHER PUBLICATIONS

First Office Action for Chinese Application No. 202080039062.7 mailed on Sep. 15, 2023, with its English Translation, 26 pages.
Examination Report for GB Application No. 1908383.1 mailed on Sep. 22, 2023, 2 pages.
Examination Report for Indian Application No. 202147053288 mailed on Sep. 22, 2023, 7 pages.
Decision of Final Rejection for Chinese Application No. 202080039721.7 mailed on Sep. 28, 2023, with its English Translation, 29 pages.
Substantive Examination Adverse Report for Malaysian Application No. PI2021006975 mailed on Dec. 14, 2023, 3 pages.
Office Action for Canada Application No. 3,141,396 mailed on Dec. 4, 2023, 5 pages.
Office Action for U.S. Appl. No. 17/612,789 mailed Jan. 23, 2024, 12 pages.
Office Action for Indonesian Application No. P00202110077 mailed on Aug. 22, 2023, with its English Translation, 6 pages.
Office Action for Canada Application No. 3,140,133 mailed on Nov. 23, 2023, 5 pages.
Written Opinion for Singapore Application No. 11202113039U mailed on Nov. 24, 2023, 6 pages.
Substantive Examination for Russia Application No. 2021134521/03(072949) mailed on Dec. 6, 2023, with its English Translation, 8 pages.
Office Action for Japan Patent Application No. 2021-571876, mailed Mar. 5, 2024, and its English translation, 30 pages.
Office Action for Japan Patent Application No. 2021-571881, mailed Feb. 27, 2024, and its English translation, 9 pages.
Search Report for Malaysia Patent Application No. PI2021007015, mailed Apr. 18, 2024, 5 pages.
Office Action for Chinese Application No. 202080039362.5 mailed on Nov. 27, 2023, with its English Translation, 19 pages.
Written Opinion for Singapore Application No. 11202112829T mailed on Nov. 27, 2023, 5 pages.
Office Action and Search Report for Russian Patent Application No. 2021134529/03(072983), mailed Apr. 18, 2024, and its English translation, 20 pages.
Volzhenskiy et al., Mineral Binding Materials, Moscow, Stroyizdat, 1979, p. 436-438, 442, and its English translation, 8 pages.
Office Action for Japanese Patent Application No. 2021-571879, mailed Mar. 28, 2024, and its English translation, 8 pages.
Yoshioka et al., Development of the Environmental Clean-Up Material from Water-Purifying Sludge, 2009, 8 pages.
Office Action for European Patent Application No. 20 732 860.0, mailed Nov. 13, 2024, and its English translation, 10 pages.
Office Action for Canadian Patent Application No. 3,141,434, mailed Jan. 12, 2024, 6 pages.
Office Action for Vietnamese Patent Application No. 1-2021-07698, mailed Jan. 31, 2024, and its English translation, 4 pages.
Office Action for Vietnamese Patent Application No. 1-2021-07697, mailed Jan. 31, 2024, and its English translation, 4 pages.
Office Action for European Patent Application No. 20 732 865.9, mailed Jan. 14, 2025, 5 pages.
Elangovan et al., Reuse of alum sludge in clay brick manufacturing, Water Science & Technology: Water Supply, 2011, vol. 11, No. 3, p. 333-341.
Yoshioka et al., Development of the Environmental Clean-Up Material from Water-Purifying Sludge, Annual Report of the Mie Institute for Environmental Conservation, 2009, with machine translation, 17 pages.
Written Opinion for Singapore Application No. 11202112832X mailed on Nov. 27, 2023, 7 pages.
Written Opinion for Singapore Application No. 11202113036W mailed on Nov. 24, 2023, 7 pages.
Office Action for Canada Application No. 3,140,520 mailed on Dec. 1, 2023, 4 pages.
Office Action for Chinese Patent Application No. 202080039362.5, mailed Oct. 18, 2024, and its English translation, 20 pages.
Guo et al., Mineral Formation Mechanism of Calcium Sulphoaluminate Cement Clinker in Hydrothermal-Low Temperature Sintering Process, Journal of the Chinese Ceramic Society, Feb. 2018, vol. 46, No. 2, 12 pages.
Office Action for Chinese Patent Application No. 202080039062.7, mailed Jun. 7, 2024, and its English translation, 26 pages.
Wang, Ion Exchange Technology in Pollution Control, Compiled by C. Calmon H. Gold, Sun Fangjiu Xianghua School, Atomic Energy Press, 1979, and its English translation, 12 pages.
Zou, Material Utilization Technology and Principles of Sludge, Heilongjiang University Press, May 2015, and its English translation, 11 pages.
Office Action for corresponding Indian Patent Application No. 202147057863, mailed Feb. 13, 2025, 2 pages.

* cited by examiner

METHOD FOR THE MANUFACTURE OF HYDRAULIC BINDERS FROM WATER TREATMENT RESIDUALS

FIELD OF THE INVENTION

This invention relates to a method for the manufacture of hydraulic binders from water treatment residuals or other aluminium rich waste residuals, and in particular to a method for the manufacture of calcium aluminate and/or calcium sulphoaluminate containing hydraulic binders.

BACKGROUND OF THE INVENTION

Water treatment residuals (hereinafter referred to as WTR or residuals) is a waste material produced from the industrial purification of drinking water by coagulation using a flocculant, typically comprising aluminium compounds such as aluminium sulphate ($Al_2(SO_4)_3 \cdot 14H_2O$), commonly referred to as Alum, or ferric aluminium sulphate (ferrum). Coagulation removes particles suspended in natural, untreated water. The chemical reaction involved comprises:

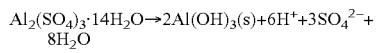

The coagulated solids are separated from the treated water to form an aluminium rich waste slurry, referred to as WTR. WTR typically consist of amorphous aluminium hydroxide, water, organic material, remnant flocculant and other minor components.

There are currently few viable recycling options for this material, much of which ends up in landfill. This type of waste is generated worldwide and the ability to recycle it would have global appeal.

A cement is a binder, a substance used for construction that sets, hardens, and adheres to other materials to bind them together. Cement is seldom used on its own, but rather to bind sand and gravel (aggregate) together. Cement mixed with fine aggregate produces mortar for masonry, or with sand and gravel, produces concrete. Cements used in construction are usually inorganic, often lime or calcium silicate based, and can be characterized as either hydraulic or non-hydraulic, depending on the ability of the cement to set in the presence of water (in the case of hydraulic binders).

High alumina cements, such as calcium aluminate and calcium sulphoaluminate cements, are usually made from limestone and bauxite. Hydration of calcium aluminate cements typically produces calcium aluminate hydrates while hydration of calcium sulphoaluminate cements typically produce ettringite, and specialized physical properties (such as expansion or rapid reaction) can be obtained by adjustment of the availability of calcium and sulphate ions. Calcium aluminate and calcium sulphoaluminate cements are typically industrially manufactured by high temperature sintering methods (>1200° C.), requiring substantial energy resources and resulting in high $CO_2$ production.

An object of the present invention is to provide a method for manufacturing high alumina hydraulic binders, in particular calcium aluminate and/or calcium sulphoaluminate cements, at relatively low temperatures and using water treatment residuals as a raw material, thereby providing a more environmentally friendly and lower cost alternative to the traditional methods of manufacture of high alumina cements.

SUMMARY OF THE INVENTION

According to a first aspect of the present invention there is provided a method for the manufacture of a high alumina hydraulic binder comprising hydrating a source of aluminium ions with a source of calcium ions in the presence of water to form mineral hydrates and subsequently heating said mineral hydrates to form said high alumina hydraulic binder.

In one embodiment a source of sulphate ions may be mixed with said source of aluminium ions and said source of calcium ions prior to and/or during hydration.

Preferably said source of aluminium ions comprises water treatment residuals.

The water treatment residuals may be formed in particular in the form of drinking water treatment residuals, which can be purified much more easily than other residuals, such as waste water treatment residuals or the like, in particular because they are less contaminated. Because of the different ingredients of drinking water and wastewater, these (drinking water/wastewater) are not directly comparable.

Organic material present in said water treatment residuals may form a source of fuel energy during said heating step and air or oxygen may be added to the mixture during said heating step to facilitate oxidation of said organic material.

The method may further comprise comminuting said hydrated minerals prior to said heating step.

Preferably said hydrated minerals are heated to at least 350° C. in said heating step to achieve the most efficient binder.

According to a further aspect of the present invention there is provided a method for the manufacture of calcium aluminate cement comprising the steps of mixing a source of calcium ions with water treatment residuals, or other aluminium rich waste residuals, in the presence of water, in a mixing step, such that mineral hydrates are formed, and subsequently heating the resulting mineral hydrates to a temperature of at least 350° C. in a thermal treatment step to oxidise organic material present and to at least partially dehydrate the hydrated minerals to form the resulting cement product.

According to a yet further method the manufacture of calcium sulphoaluminate cement comprising the steps of mixing a source of calcium ions and sulphate salts with water treatment residuals, or other aluminium rich waste residuals, in the presence of water, in a mixing step, such that mineral hydrates are formed, and subsequently heating the resulting mineral hydrates to a temperature of at least 350° C. in a thermal treatment step to oxidise organic material present and to at least partially dehydrate the hydrated minerals to form the resulting cement product.

The mineral hydrates may be comminuted prior to said thermal treatment step.

The water treatment residuals may be at least partially dewatered prior to said mixing step. Air may be added to the material during the thermal treatment stage to facilitate oxidation of organic material.

The source of calcium ions may comprise lime or hydrated lime.

EMBODIMENTS OF THE PRESENT INVENTION

Method for the manufacture of hydraulic binder from WTR, or other aluminium rich waste residuals, in accordance with a number of embodiments of the present invention will now be described, by way of example only.

Water treatment residuals consist of water, organic material and inorganic material. The inorganic material consists predominately of amorphous aluminium oxide and/or amorphous aluminium hydroxide (typically 75 to 80% amorphous aluminium oxide, that is a degree of crystallisation of 20 to 25%, measurable for example, by spectroscopic methods, DSC measurements or X-ray diffraction experiments). The remaining inorganic components (primarily varying amounts of quartz and iron oxide) are essentially inert fillers. The amorphous aluminium oxides/hydroxides can be utilised in methods in accordance with various embodiments of the present invention, as will be described below, in a hydration/dehydration process to form cementitious minerals.

Calcium aluminate hydrates may be formed when the WTR are mixed with a source of calcium ions (e.g. Portland cement, hydrated lime) in the presence of water.

Ettringite ($Ca_6[Al(OH)_6]_2(SO_4)_3 \cdot 26H_2O$) may be formed when the WTR are mixed with a source of calcium ions (e.g. Portland cement, hydrated lime) and a source of sulphate ions (e.g. calcium sulphate) in the presence of water.

The exact formulations of precursor materials used to manufacture the desired cementitious materials will depend on the chemical composition of the water treatment residuals used and the specific industrial application of the finished product.

In accordance with various embodiments of the present invention there is provided a method for the manufacture of hydraulic binders using water treatment residuals or other high aluminium content residuals containing a reactive source of aluminium (such as amorphous aluminium hydroxide, amorphous aluminium oxide or aluminium chloride) as a raw material. The term amorphous in mineralogy refers to a solid/material without crystalline form. A typical chemical composition of Water Treatment Residuals (WTR) in Northern Ireland would indicate that 80-90% of the inorganic material is amorphous aluminium hydroxide. Another common composition is between 50-80% amorphous aluminium hydroxide. Other WTR contain inorganic material that has less than 50% amorphous aluminium hydroxide.

It would be advantageous for the processed material, when producing a cement product, to contain as much amorphous aluminium hydroxide as possible. This is because crystalline forms of aluminium hydroxide/oxide are basically inert (chemically unreactive) in cementitious systems. However, amorphous forms of aluminium hydroxide, oxyhydroxide and oxide are chemically reactive in cementitious systems and will, for example, react with hydrated lime, in the presence of water, to form calcium aluminate hydrates. Such reactions are strength giving and result in the formation of a hardened material. Other beneficial properties (fast setting, rapid strength, rapid drying) can also be obtained. However, WTR containing lower levels of amorphous aluminium hydroxide can still be useful, depending on the application.

In a first embodiment, the precursor materials preferably include a source of calcium ions (e.g. lime, hydrated lime) and aluminium rich WTR (or any other source of amorphous aluminium oxide/hydroxide (e.g. ECEM) or other suitable aluminium containing waste material containing a reactive or soluble source of aluminium ions). A source of water is also required. The source of water could be from the water present in the WTR.

The method comprises the following steps:
Step 1: Blending/Mixing the Precursor Materials The precursor materials are blended and mixed with water to form a paste/slurry. The WTR may be used as received. Alternatively, the WTR may be partially dewatered and milled or otherwise comminuted to a particle size appropriate to the application, for example approximately 40 microns.

The composition and ratio of the precursor materials can be varied to produce a range of calcium aluminate hydrates (such as semicarbonate and katoite).

The selection of apparatus used for mixing will be dependent upon the rheology of the mix. In one embodiment the mixing apparatus is envisaged to be similar to a concrete mixer. The mixing apparatus may be adapted to provide batches or to provide a continuous supply of mixed precursor materials.

Step 2: Hydration

During the hydration period, hydrates form and the material may set. It is preferable that hydration is complete in a time period less than 24 hours. Depending on the choice of precursor materials, a range of hydrates form.

Step 3: Thermal Treatment

In a thermal treatment step the hydrated material is thermally treated, for example to a temperature of at least 350° C. Preferably air is added during heating at a rate adapted to ensure that substantially all organic material in the WTR is oxidised:

The calorific value of the organic material in the WTR (~5-10 MJ/Kg) may be used as an energy source (total or in part) for the thermal treatment process.

Thermal treatment temperatures can range from 350° C. to >1200° C. It may be preferred that thermal treatment does not exceed 800° C. to maximise the reactivity of the material.

Prior to thermal treatment, the hydrated material may be partially dewatered and milled or otherwise comminuted to a particle size appropriate to the application, for example approximately 40 microns.

Thermal treatment may take place in a suitable heating chamber, such as a rotary calciner, flash calcination device or similar.

The thermal treatment step produces a range of anhydrous calcium aluminate minerals. The type and quantity of each mineral in the resulting product substantially depends upon the ratio of the precursor materials and the composition of the WTR or other precursor materials used.

As temperature achieved during the thermal treatment step increases, the calcium aluminate minerals become more crystalline.

Step 4: Finished Product: CA Cement

The finished product (consisting of a mixture of anhydrous calcium aluminate minerals) is cooled. After cooling the finished product may be optionally milled or otherwise comminuted to form a final cement product.

In accordance with a second embodiment of the present invention there is provided a method for the manufacture of calcium sulphoaluminate cement using water treatment residuals or other high aluminium content residuals as a raw material mixed with a source of calcium ions and a source of sulphate salts.

In one example the precursor materials may include a source of Ca ions (e.g. lime, hydrated lime), sulphate salts (e.g. gypsum, anhydrite, hemihydrate) and aluminium rich WTR (or source of amorphous aluminium oxide/hydroxide (e.g. ECEM)). As with the first embodiment, the source of water could be from the water present in the WTR.

Step 1: Blending of WTR with a Source of Calcium Ions and Sulphate Salts

Hydrated lime (or lime), a sulphate salt (e.g. gypsum, anhydrite, hemihydrate) and aluminium rich WTR are blended and mixed with water to form a paste/slurry.

The WTR may be used as received. Alternatively, the WTR may be partially dewatered and milled or otherwise comminuted to a suitable particle size.

Depending on the composition of the WTR, the inclusion of a sulphate source may be optional (i.e. a sulphate source may already be present in the WTR).

The composition and ratio of the precursor materials can be varied to produce a range of calcium sulphoaluminate hydrates (such as ettringite) and calcium aluminate hydrates (such as semicarbonate or katoite).

As with the first embodiment, the selection of the mixing apparatus to be used to mix the precursor materials is dependent upon the rheology of the mix. The mixing apparatus may provide continuous or batch mixes.

Step 2: Hydration

During the hydration period, hydrates form and the product may set. It is preferable that hydration is complete in a time period less than 24 hours. Depending on the composition and ratio of the precursor materials a range of hydrates form. An example of such is the formation of the mineral ettringite.

The table shown in FIG. 1 shows an XRD trace of a hydrated blend containing WTR, hydrated lime and calcium sulphate made in accordance with this method.

Step 3: Thermal Treatment

The hydrated material produced from the second step is thermally treated (for example at a temperature of at least 350° C. to substantially maximise the dehydration of the hydrates).

Preferably air is added during heating at a rate adapted to ensure that substantially all organic material in the WTR is oxidised.

The calorific value of the organic carbon from WTR (~5-10 MJ/Kg) may be used as a fuel source (total or in part) for the thermal treatment process.

Thermal treatment temperatures can range from 350° C. to >1200° C. Preferably thermal treatment does not exceed 800° C. to maximise the reactivity of the material, in particular to ensure that residual amorphous $Al_2O_3$ remains in its amorphous and hence reactive state.

Prior to thermal treatment the hydrated material may be partially dewatered and milled or otherwise comminuted to a suitable particle size, for example approximately 40 microns.

The thermal treatment step may take place in a rotary calciner, a flash calcination device or similar.

Figure 2:
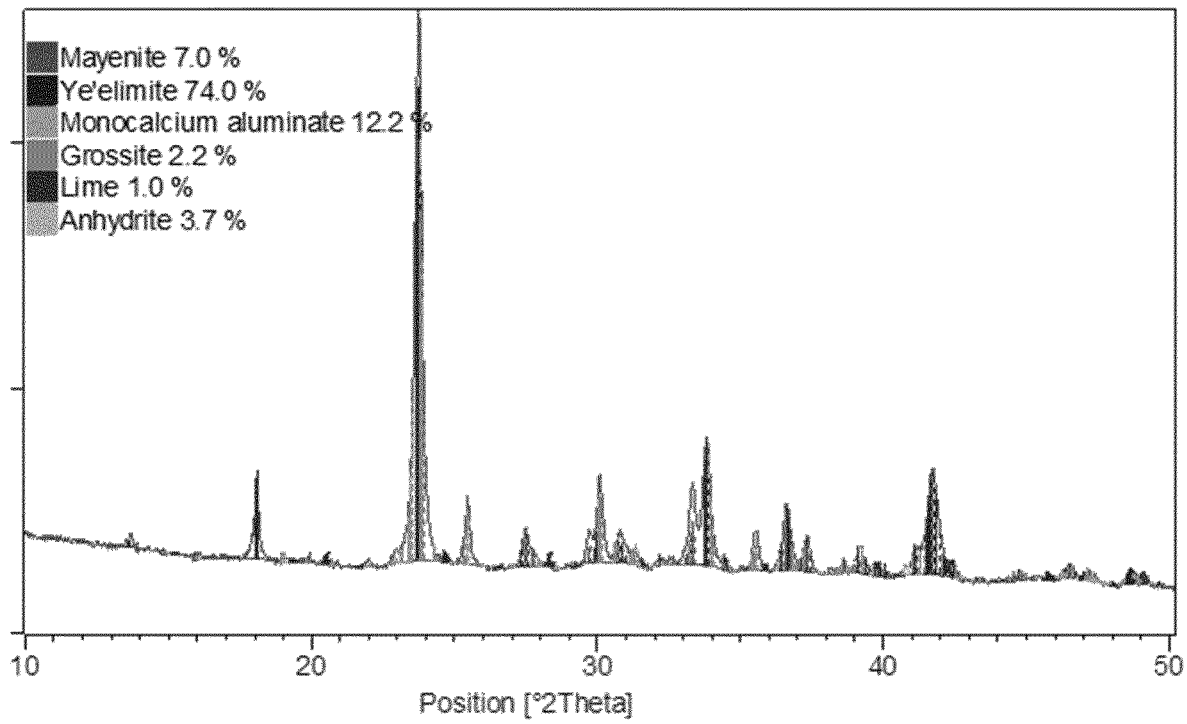

The thermal treatment step may produce a range of calcium sulphoaluminate and calcium aluminate minerals (see FIG. 2).

The type and quantity of each mineral substantially depends upon the composition and ratio of the precursor materials and in particular the composition of the WTR.

As temperature reached during the thermal treatment step increases the calcium aluminate and calcium sulphoaluminate minerals become more crystalline.

Step 4: Finished Product: CSA Cement

The finished product (consisting of calcium sulphoaluminate and calcium aluminate minerals) is cooled. After cooling the finished product may be optionally milled or otherwise comminuted to the required particle size.

The cements produced may include a range of calcium aluminate and calcium sulphoaluminates, such as ye'elimite ($C4A3\hat{S}$—$Ca_4(AlO_2)_6SO_4$), monocalcium aluminate (CA—$CaAl_2O_4$), mayenite (C12A7—$Ca_{12}Al_{14}O_{33}$) and tricalcium aluminate (C3A—$Ca_3(AlO_3)_2$).

It is envisaged that one application of the resulting hydraulic binder produced by a method in accordance with the present invention may be used in the manufacture of floor screed. It has been found that the processed residuals, particularly in the form of Ettringite, exhibit shrinkage compensating characteristics. As such, the product produced from the processed residuals can be a direct competitor to Portland cement based screeds.

The present invention provides a method for the manufacture of a high alumina hydraulic binder that can utilise waste materials and requires much lower energy inputs than prior art methods and therefore provides a more environmentally friendly and lower cost alternative to the traditional methods of manufacture of high alumina cements.

The invention is not limited to the embodiments described herein but can be amended or modified without departing from the scope of the present invention as defined in the appended claims.

The invention claimed is:

1. A method for the manufacture of a high alumina hydraulic binder comprising hydrating a source of aluminium ions with a source of calcium ions in the presence of water to form mineral hydrates and subsequently heating said mineral hydrates to form said high alumina hydraulic binder, wherein said source of aluminium ions comprises drinking water treatment residuals, wherein organic material present in said drinking water treatment residuals forms a source of fuel energy during said heating, wherein air or oxygen are added to the mixture during said heating to facilitate oxidation of said organic material.

2. The method as claimed in claim 1, wherein a source of sulphate ions is mixed with said source of aluminium ions and said source of calcium ions at least prior to or during hydration.

3. The method as claimed in claim 1, further comprising comminuting said mineral hydrates prior to said heating.

4. The method as claimed in claim 1, wherein said mineral hydrates are heated to at least 350° C. in said heating.

5. The method as claimed in claim 1, wherein said source of calcium ions comprises lime or hydrated lime.

* * * * *